Patented Nov. 9, 1943

2,333,660

UNITED STATES PATENT OFFICE 2,333,660

PRODUCTION OF TITANIUM DIOXIDE

Andrew T. McCord, Collingswood, and Harold F. Saunders, Haddonfield, N. J., assignors to The Sherwin-Williams Company, Cleveland, Ohio, a company of Ohio No Drawing. Application September 13, 1940, Serial No. 356,646

22 Claims. (Cl. 23—202)

This invention relates to the preparation of titanium pigments, and particularly to the preparation of nuclear solutions and seed crystals and their use in the precipitation of titanium compounds by hydrolysis at elevated temperatures of sulphuric acid solutions containing titanium.

Titanium dioxide pigments are most commonly precipitated from titanium sulphate solutions which have been prepared from the reaction product of a titanium ore, such as ilmenite and sulphuric acid. The preparation of such solutions is well known in the art and has been described by Blumenfeld in Patent No. 1,504,669 and by others.

It is also well known in the art that there exists "a wide variance in the physical and chemical properties of the titanium dioxide produced by hydrolysis dependent upon the exact conditions under which hydrolysis takes place," as stated by Blumenfeld in his Patent No. 1,851,487.

Such variance depends in part "upon certain transformations which the constituents of the solution undergo before and during the precipitation of the titanium hydroxide," as stated by Blumenfeld in Patent No. 1,504,672.

The hydrolytic precipitation of titania from crystalloid titanium solutions may be initiated and/or accelerated by the addition to the titanium solution of a nucleus liquor, that is a liquor containing titanium compounds as seed material or nuclei in colloidal form. The quality of the titanium dioxide produced, as well as the yield, is greatly enhanced by this procedure.

In the prior art, the product resulting from the hydrolysis at elevated temperatures of a crystalloidal solution of titanium in sulphuric acid in the presence of an adequate amount of colloidal $TiO_2$ compound, after suitably washing, treating and calcining the precipitate, has been the anatase modification.

The hiding power of a pigmentary substance is a function of both its particle size and its index of refraction. The rutile modification of titanium dioxide possesses an index of refraction of 2.71, whereas that of the anatase modification is 2.51.

Pigmentary $TiO_2$ in the anatase modification may be converted to rutile by calcination at elevated temperatures and in the presence of a sintering agent. Such converted form possesses an excellent resistance of chalking upon exposure to weather but the conditions of conversion cause a simultaneously increase of particle size to an extent such that the hiding power and color are deleteriously affected. The product does not acquire the increased hiding that is indicated by its greater index of refraction.

We have discovered than when the hydrolysis of the titanium sulphate solution is effected in the presence of a certain type of nuclear substance, hereinafter described, such specially prepared nuclear material being added to the solution prior to hydrolysis, the precipitated $TiO_2$ after separating, washing, and treating (if desired) as, for instance, with an agent for the control of sintering or for added resistance to fading or chalking, or for control of other specific property, may be substantially completely converted to rutile by calcination at the usual temperatures employed, i. e., 800°–1000° C., and without objectionable increase in particle size.

In copending application, Serial No. 349,345, filed by A. T. McCord Aug. 1, 1940, (Patent 2,326,-156 issued Aug. 10, 1943), we have described a novel form of $TiO_2$ or hydrate which we have designated as "γ titanic acid" to distinguish it from the forms hitherto known and described. This novel form of titania is characterized as producing upon X-ray analysis a band pattern, the bands not corresponding in position to either the characteristic position of rutile or of anatase lines. The characteristic positions of the bands and lines are shown in the following table:

| Bands of γ titanic acid | Lines of anatase | Lines of rutile |
|---|---|---|
| Å. U. | Å. U. | Å. U. |
| 5.83 | 3.49 | 3.24 |
| 3.99 | 2.37 | 2.48 |
| 3.145 | 1.883 | 2.29 |
| 2.600 | 1.695 | 2.18 |
| 2.132 | 1.655 | 2.04 |
| 1.888 | 1.477 | 1.685 |
| 1.499 | 1.358 | 1.617 |
| 1.354 | 1.334 | 1.479 |
| 1.177 | 1.261 | 1.448 |
| .956 | 1.161 | 1.351 |
| .868 | 1.044 | 1.240 |
| .743 | 1.015 | 1.167 |
|  | .951 | 1.144 |
|  | .913 | 1.092 |
|  | .892 |  |
|  | .876 |  |
|  | .843 |  |
|  | .824 |  |
|  | .806 |  |

This γ titanic acid may be formed in a number of ways as set forth in said application, but preferably from a solution of titanium-ammonium fluoride, a complex titanium-ammonium fluoride, or titanium tetrafluoride compound by contacting a solution of such compound with aqua ammonia. It may by itself be converted into substantially pure rutile in pigmentary condition by calcination.

Where "γ titanic acid" is hereinafter referred to in this specification and the appended claims, we mean a compound of titanium, hydrogen and oxygen, which may be identified by the above stated band positions which are determinable by X-ray analysis.

We have now discovered that when γ titanic acid is used as a nucleating or seeding material in the hydrolysis of sulphuric acid solutions containing titanium, the $TiO_2$ precipitate will upon calcination be converted to rutile form at the usual calcination temperatures of between 800°–1000° C.

The ilmenite solutions as prepared in practice usually contain iron and may also contain various other impurities. The chemical composition of the solutions may vary within wide limits. The $TiO_2$ content may run as high as about 16.5%, but it is customary to employ solutions carrying about 15.5%. The free sulphuric acid may also vary within wide limits, as explained by Blumenfeld in his patents above referred to. In Example 1 of his Patent 1,795,467, he describes the preparation of such a solution, as follows:

"The titanium solution used for hydrolysis was prepared by treating a titanium bearing ore (ilmenite) with sulphuric acid. The reaction product was dissolved in water and sufficient scrap iron was added to react with the acid present and convert all of the iron present to the ferrous form. The iron content of the solution was then reduced by crystallizing the major portion of the contained ferrous sulphate and removing it from the solution."

A solution so prepared may be employed in our process to provide rutile instead of anatase.

The γ titanic acid which we use for nucleation of such a sulphuric acid solution may be prepared according to the procedure described in the Verduin and Todd application, Serial No. 321,974, filed March 2, 1940. For instance, crystallized ammonium fluotitanate is dissolved in water and the solution added at a predetermined rate with agitation into an excess of aqua ammonia. The precipitate is then separated, washed, reslurried, and heated at a boil, dewatered, and dried. γ titanic acid prepared in other ways, such, for instance, as described in Patent 2,326,156, issued Aug. 10, 1943, may be used with equivalent results.

We have carried out our present invention by various different procedures of which the following are to be considered as illustrative and not as restrictive or limiting.

*Example 1.*—To 1 kg. of an ilmenite solution, assaying 12.8% $TiO_2$, 8.86% $FeSO_4$, and 23% $H_2SO_4$ in excess of that combined with the iron, and wherein the ratio $$\frac{FeSO_4}{TiO_2}$$

is 0.692 and the ratio $$\frac{H_2SO_4}{TiO_2}$$

is 1.795, was added with agitation a quantity of γ titanic acid equivalent to 1% $TiO_2$ based on the $TiO_2$ in the ilmenite solution. The batch was brought to a boil and the boiling continued with agitation for about three hours. The hydrolyzed titania was separated, washed, and treated at a boil for 1 hours with dilute sulphuric acid to complete the removal of iron salts, rewashed, and calcined at 975° C. for four hours. The pigment obtained showed upon X-ray analysis a diffraction pattern containing only the lines characteristic of rutile. The hydrolysis was rapid and high recovery of 95% was obtained.

The quantity of γ titanic acid which may be added is apparently not critical. There should be a sufficient amount, to act as the seeding material, but an excess is not in any way detrimental because the γ titanic acid both as seed and as excess is precipitated and eventually converted into rutile on calcination. In a duplication of the procedure of Example 1, except that 6% $TiO_2$ as γ titanic acid was added to the ilmenite solution, similar results were obtained.

The concentration of $TiO_2$ in the ilmenite solution, as well as the acidity factor, may also vary within a wide range, as we have determined by a long series of experiments. We have found that the acid range within which satisfactory material may be produced is much broader than in the prior art, thus permitting the use of higher ratio of acid to ilmenite during digestion of the ilmenite ore with a considerable improvement in recovery. This ability to use higher acid ratio as, for instance, wherein the $H_2SO_4$ content is more than 2.45 times the $TiO_2$ content, also results in production of more stable solutions, requiring less care in handling and less tendency toward premature precipitation of $TiO_2$. In Examples 2 and 3, a higher $TiO_2$ concentration and a higher acid ratio is employed.

*Example 2.*—To 1 kg. of ilmenite solution, assaying 15.5% $TiO_2$, 12.78% $FeSO_4$, and 31.3% $H_2SO_4$ in excess of that combined with iron and with the ratio $$\frac{FeSO_4}{TiO_2}=.825$$

and the ratio $$\frac{H_2SO_4}{TiO_2}=2.02$$

was treated with γ titanic acid equivalent to 1% based on the $TiO_2$ in the ilmenite solution. The procedure was otherwise as Example 1, and the product after calcination was 100% rutile. The γ titanic acid may be in dry form or previously dispersed in a small quantity of water slightly acidulated with sulphuric acid.

*Example 3.*—To 1 kg. of ilmenite solution, assaying 12.0% $TiO_2$, 12.15% $FeSO_4$, and 30% $H_2SO_4$ in excess of that combined with iron, and in which the ratio $$\frac{FeSO_4}{TiO_2}$$

is 1.01 and the ratio $$\frac{H_2SO_4}{TiO_2}$$

is 2.5, was treated with γ titanic acid equivalent to 1% based on the $TiO_2$ in the ilmenite solution. The procedure was otherwise as Example 1, and the product after calcination was 100% rutile.

Although in the above examples, we employed an ilmenite solution, it is to be understood that the process may be applied to any sulphuric acid solution of titanium, such as might be prepared, by dissolving titanyl sulphate in acidified solution, or by solution in sulphuric acid of any sulphuric soluble titanium compound.

Ilmenite solutions as prepared in practice usually contain iron. The crude solutions from the attack of ilmenite by sulphuric may contain iron in the ratio $$\frac{FeSO_4}{TiO_2} = 2.5$$

It is customary in the practice of the sulphuric process to remove a considerable quantity of this iron by chilling prior to the hydrolysis to reduce the ratio $$\frac{FeSO_4}{TiO_2}$$

to 1.0 or less.

In the preceding examples the solutions which were nucleated were similar to those from which an amount of $FeSO_4$ has been removed in accordance with the usual practice, as described.

We have discovered that the ratio $$\frac{FeSO_4}{TiO_2}$$

has an influence on the quantitative conversion to rutile in the calcination step when employing precipitated $TiO_2$ obtained by hydrolysis of ilmenite solutions nucleated with $\gamma$ titanic acid. It is possible to convert precipitated $TiO_2$, either completely to rutile or to mixtures of rutile or anatase, even though the solutions contain greater amounts of iron, or are less completely purified than is the usual practice. This may be done by increasing the amount of $\gamma$ titanic acid used for nucleating and/or by increasing the time of calcination.

The following examples illustrate this:

*Example 4.*—The ilmenite solution was prepared by treating ilmenite with sulphuric acid. The resulting product was dissolved in water and sufficient scrap iron was added to react with a part of the acid present and convert all of the iron present to the ferrous form. The iron content was then reduced by crystallization:

|  | Assay | | |
| --- | --- | --- | --- |
|  | #1 | #2 | #3 |
| $TiO_2$ _____ per cent__ | 12.8 | 11.0 | 11.0 |
| $H_2SO_4$ _____ do____ | 23.0 | 19.7 | 19.7 |
| Fe _____ do____ | 8.86 | 15.7 | 15.7 |
| $\frac{FeSO_4}{TiO_2}$ | .692 | 1.425 | 1.425 |
| $\frac{H_2SO_4}{TiO_2}$ | 1.795 | 1.795 | 1.795 |

The procedure for nucleation, hydrolysis and succeeding steps was performed as described under Example 1, except that in Examples 1 and 2 a quantity of $\gamma$ titanic acid equivalent to 1% of the $TiO_2$ in the ilmenite solution was used as nuclei, while in Example 3, 6% was employed. The products after calcination for 4 hours at 975° C. showed Example 1 to be 100% rutile, Example 2, 40% rutile and 60% anatase, and Example 3, 60% rutile and 40 anatase. Example 3 when calcined 2 hours at 1000° C., gave 100% rutile.

We have referred only to addition of the dry $\gamma$ titanic acid to the ilmenite solution. It will be evident that the $\gamma$ titanic acid can be previously slurried in water, or dispersed in sulphuric acid, or ilmenite solution, or it may be used in the titanous form $Ti_2(SO_4)_3$, obtainable by reaction in sulphuric acid dispersion with zinc.

Having thus described our invention, what we claim as new and desire to secure by Letters Patent is:

1. The process for the hydrolytic precipitation of titanic acid directly convertible into rutile by calcination at temperatures below 1000° C. from a sulphuric acid solution containing titanium sulphate and iron sulphate, which includes the step of carrying out the precipitation in the presence of $\gamma$ titanic acid.

2. The process for the hydrolytic precipitation of titanic acid directly convertible into rutile by calcination at temperatures below 1000° C. from a sulphuric acid solution containing titanium and iron, which includes the step of carrying out the precipitation in the presence of a titanic acid which is itself directly convertible into rutile by calcination at temperatures below 1000° C.

3. The process for the hydrolytic precipitation of titanic acid directly convertible into rutile by calcination at temperatures below 1000° C. from a sulphuric acid solution containing titanium and iron, which includes the step of carrying out the precipitation in the presence of titanic acid obtained by treating a titanium-ammonium-fluoride compound with an excess of ammonia.

4. The process for the hydrolytic precipitation of titanic acid directly convertible into rutile by calcination at temperatures below 1000° C. from a sulphuric acid solution containing titanium sulphate and iron sulphate, which includes the step of carrying out the precipitation in the presence of $\gamma$ titanic acid.

5. The process for the hydrolytic precipitation of titanic acid directly convertible into rutile by calcination at temperatures below 1000° C. from a sulphuric acid solution of titania and iron, which includes the step of carrying out the precipitation in the presence of $\gamma$ titanic acid.

6. The process for the hydrolytic precipitation of titanic acid directly convertible into rutile by calcination at temperatures below 1000° C., which includes boiling and agitating a mixture of a sulphuric acid solution containing titanium sulphate, iron sulphate and $\gamma$ titanic acid.

7. The process for the hydrolytic precipitation of titanic acid directly convertible into rutile by calcination at temperatures below 1000° C. from a sulphuric acid solution containing titanium sulphate and iron sulphate, which includes the step of carrying out the precipitation in the presence of a small amount of $\gamma$ titanic acid.

8. The process for the hydrolytic precipitation of titanic acid directly convertible into rutile by calcination at temperatures below 1000° C. from a sulphuric acid solution containing titanium sulphate and iron sulphate, which includes the step of adding $\gamma$ titanic acid, boiling and agitating.

9. A process of producing rutile from a solution containing $H_2SO_4$, $TiO_2$ and FeO, which includes adding a small amount of $\gamma$ titanic acid, boiling, to form a precipitate, separating and washing the precipitate, and calcining said precipitate.

10. A process of producing rutile, which includes adding to a titanium sulphate solution, a solution of a colloidal titanic acid which is directly convertible into rutile by calcination, boiling the mixture, removing the resulting precipitate, and calcining said precipitate.

11. A pigmentary rutile characterized by having been prepared by a process, including the steps of seeding a titanium sulphate solution with $\gamma$ titanic acid, boiling to form a precipitate, and calcining the hydrate at a temperature not exceeding 1000° C.

12. In a process for the production of titanium oxide in the form of rutile, the steps comprising adding a small amount of a precipitated titanium compound obtained by contacting a solution of ammonium titanium fluorine compound with ammonia, to a titanium sulphate solution, and heating said mixture to effect hydrolysis and precipitation.

13. In the preparation of rutile, the steps comprising mixing a separately prepared dispersion of γ titanic acid as a seeding material with a solution containing titanium sulphate, and heating the mixed solutions to effect hydrolysis.

14. A process of preparing a rutile crystal titanium dioxide, which includes heating a mixture of a sulphuric acid solution of titania and γ titanic acid.

15. A process of preparing a rutile crystal titanium dioxide, which includes heating a mixture of a sulphuric acid solution of titania and γ titanic acid, the quantity of said γ titanic acid being small and such as to not materially change the acidity of the solution, purifying the resulting precipitate, and calcining it.

16. In a method of hydrolyzing a sulphuric acid solution of ilmenite, the step which consists in adding to said solution a small quantity of γ titanic acid.

17. In a method of hydrolyzing a sulphuric acid solution of titanium, the step which consists in heating said solution with titanium nuclear solution of γ titanic acid.

18. In the hydrolytic precipitation of titanic acids from sulphuric acid solutions of ilmenite, the step which consists in adding to said solutions a small amount of titanic acid obtained by precipitation from ammonium fluotitanate solutions with ammonia.

19. In the manufacture of titanium dioxide from sulphuric acid solutions of ilmenite, the step which comprises addition of γ titanic acid as a nucleating agent.

20. In the manufacture of titanium dioxide from a sulphuric acid solution of titanium, the step which comprises adding γ titanic acid to said solution.

21. In the manufacture of titanium dioxide from a sulphuric acid solution of titanium, the step which comprises adding to said solution γ titanic acid dispersed in an aqueous solution containing sulphuric acid.

22. In the manufacture of titanium dioxide from a sulphuric asid solution of titanium, the step which consists in adding to the said solution prior to hydroylsis a nucleating solution obtained by adding γ titanic acid to a dilute sulphuric acid containing solution.

ANDREW T. McCORD.
HAROLD F. SAUNDERS.